United States Patent
Allen et al.

(10) Patent No.: US 12,354,090 B2
(45) Date of Patent: Jul. 8, 2025

(54) BLOCKCHAIN-BASED METHOD AND SYSTEM FOR SPECIFYING THE RECIPIENT OF AN ELECTRONIC COMMUNICATION

(71) Applicant: nChain Licensing AG, Zug (CH)

(72) Inventors: Gavin Allen, London (GB); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/648,445

(22) Filed: Apr. 28, 2024

(65) Prior Publication Data
US 2024/0289785 A1 Aug. 29, 2024

Related U.S. Application Data

(63) Continuation of application No. 18/095,996, filed on Jan. 11, 2023, now Pat. No. 11,995,646, which is a
(Continued)

(30) Foreign Application Priority Data

Oct. 25, 2016 (GB) .................................. 1617950
Oct. 25, 2016 (GB) .................................. 1617951

(51) Int. Cl.
*G06Q 20/38* (2012.01)
*G06F 21/64* (2013.01)
(Continued)

(52) U.S. Cl.
CPC ....... *G06Q 20/3825* (2013.01); *G06F 21/645* (2013.01); *G06Q 20/0658* (2013.01);
(Continued)

(58) Field of Classification Search
CPC ................ H04L 9/0637; H04L 9/3247; H04L 63/0421; H04L 9/50; H04L 2209/56;
(Continued)

(56) References Cited

U.S. PATENT DOCUMENTS 10,050,779 B2  8/2018  Alness et al.
11,574,303 B2  2/2023  Allen et al.
(Continued)

FOREIGN PATENT DOCUMENTS

FR    3018378 A1    9/2015
JP    2002197278 A  7/2002
(Continued)

OTHER PUBLICATIONS

English language translation of Korean Patent KR-20170099155-A (13 pages) (Year: 2016).*
(Continued)

*Primary Examiner* — Joseph P Hirl
*Assistant Examiner* — Thomas A Gyorfi
(74) *Attorney, Agent, or Firm* — Tarolli, Sundheim, Covell & Tummino LLP

(57) ABSTRACT

A method and corresponding system is presented for controlling a blockchain transaction output and/or specifying the recipient of the output. It also provides a method of controlling and/or generating an electronic communication. The unlocking script is provided in order to spend an output from a further transaction ($Tx_2$) on the blockchain. The input of the transaction ($Tx_1$) and/or the output of the further transaction ($Tx_2$) may be associated with a tokenised asset represented on, or referenced via, the blockchain. The notification address may be associated with an asset or resource represented on the blockchain, or a controller of an asset or resource represented on the blockchain. The notification address may be a network address, a cryptographic key, a
(Continued)

uniform resource locator (URI), email address or any other address or identifier which can be represented in the metadata of a transaction script and used as a destination for an electronic communication.

13 Claims, 9 Drawing Sheets

Related U.S. Application Data continuation of application No. 16/344,295, filed as application No. PCT/IB2017/056584 on Oct. 24, 2017, now Pat. No. 11,574,303.

(51) Int. Cl.

| | |
|---|---|
| *G06Q 20/06* | (2012.01) |
| *G06Q 20/10* | (2012.01) |
| *G06Q 20/36* | (2012.01) |
| *G06Q 20/40* | (2012.01) |
| *H04L 9/00* | (2022.01) |
| *H04L 9/06* | (2006.01) |
| *H04L 9/32* | (2006.01) |
| *H04L 9/40* | (2022.01) |

(52) U.S. Cl.
CPC ......... *G06Q 20/10* (2013.01); *G06Q 20/3672* (2013.01); *G06Q 20/3674* (2013.01); *G06Q 20/3829* (2013.01); *G06Q 20/401* (2013.01); *H04L 9/0637* (2013.01); *H04L 9/3247* (2013.01); *H04L 63/0421* (2013.01); *G06Q 20/389* (2013.01); *G06Q 2220/00* (2013.01); *H04L 9/50* (2022.05); *H04L 2209/56* (2013.01)

(58) Field of Classification Search
CPC ... H04L 67/10; G06F 21/645; G06Q 20/3825; G06Q 20/0658; G06Q 20/10; G06Q 20/3672; G06Q 20/3674; G06Q 20/3829; G06Q 20/401; G06Q 20/389; G06Q 2220/00
See application file for complete search history.

(56) References Cited

U.S. PATENT DOCUMENTS

| | | | |
|---|---|---|---|
| 2015/0324789 A1 | 11/2015 | Dvorak et al. | |
| 2016/0234026 A1 | 8/2016 | Wilkins et al. | |
| 2016/0292672 A1 | 10/2016 | Fay et al. | |
| 2016/0342976 A1 | 11/2016 | Davis | |
| 2016/0342989 A1 | 11/2016 | Davis | |
| 2016/0342994 A1 | 11/2016 | Davis | |
| 2016/0350728 A1 | 12/2016 | Melika et al. | |
| 2016/0350749 A1 | 12/2016 | Wilkins et al. | |
| 2017/0005804 A1 | 1/2017 | Zinder | |

FOREIGN PATENT DOCUMENTS

| | | | | |
|---|---|---|---|---|
| JP | 2016018393 A | | 2/2016 | |
| KR | 20170099155 A | * | 2/2016 | ............. G06Q 40/04 |
| WO | 2015142765 A1 | | 9/2015 | |
| WO | 2015171580 A1 | | 11/2015 | |
| WO | 2017178956 A1 | | 10/2017 | |
| WO | 2017187395 A1 | | 11/2017 | |

OTHER PUBLICATIONS

Alp et al., "Implementing External State Contracts—Feedback Requested," Jul. 25, 2013 [retireved Feb. 28, 2017], https://bitcointalk.org/index.php?topic=260898.30, 10 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "My Wallet," Blockchain.info, Mar. 23, 2015, https://web.archive.org/web/20150323231530/https://blockchain.info/wallet, 3 pages.
Anonymous, "Payment Notifications," Blockchain.info, Mar. 25, 2015, https://web.archive.org/web/20150325155533/https://blockchain.info/wallet/payment-notifications, 3 pages.
Antonopoulos, "Mastering Bitcoin—Unlocking Digital Cryptocurrencies," O'Reilly Media, Inc., Dec. 20, 2014, 282 pages.
Buntinx, "Future Use Cases for Blockchain Technology: Distributed Email Services", Bitcoin.com, Bitcoin News, Aug. 6, 2015, 12 pages.
Calaber24p et al., "Issuing Dividends Through the Blockchain?," Bitcoin Forum, May 3, 2014 [retrieved Feb. 21, 2017], https://bitcointalk.org/index.php?topic=593866.0, 3 pages.
Carignan et al., "Contracts," Bitcoin Developers Guide, Oct. 23, 2015 [retrieved May 2, 2017], https://github.com/bitcoin-dot-org/bitcoin.org/blob/64e4c549bc5fae480e2f2400c052686fd34c8fae/_includes/devdoc/guide_contracts.md, 4 pages.
Counterparty, "Counterparty-server API and FAQ" Counterparty, Dec. 2015 [retrieved Feb. 22, 2017], https://counterparty.io/docs/api/, 68 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
De Rosa, Davide, "A Developed-oriented Series About Bitcoin", various chapters published between Apr. 25, 2015 and Jun. 23, 2015, 136 pages.
Gross et al., "Should we migrate to an output model rather than a address model? #189," GitHub, Jun. 4, 2014 [retrieved Feb. 22, 2017], https://github.com/OmniLayer/spec/issues/189, 13 pages.
Hearn et al., "Decentralized networks for instant, off-chain payments," Bitcoin Forum, Mar. 12, 2013 [retrieved Feb. 27, 2017], https://bitcointalk.org/index.php?topic=152334.0, 16 pages.
International Search Report and Written Opinion mailed Jan. 26, 2018, Patent Application No. PCT/IB2017/056583, 11 pages.
International Search Report and Written Opinion mailed Jan. 26, 2018, Patent Application No. PCT/IB2017/056584, 11 pages.
Jtimon et al., "A generic protocol for cryptographic assets," Bitcoin Forum, Jan. 21, 2012 [retrieved Feb. 22, 2017], https://bitcointalk.org/index.php?topic=60591.0;all, 12 pages.
Le Calvez, "A look at Bitcoin non-standard outputs," Medium, Nov. 8, 2015 [retrieved Feb. 28, 2017], https://medium.com/@alcio/a-look-at-bitcoin-non-standard-outputs-c97f65cccbb6#.3fw5ur52k, 6 pages.
Moore et al., "What is the point of SIGHASH_NONE?," StackExchange, Jul. 19, 2012 [retrieved May 2, 2017], https://bitcoin.stackexchange.com/questions/4213/what-is-the-point-of-sighash-none/4218, 2 pages.
Nakamoto, "Bitcoin: A Peer-to-Peer Electronic Cash System," Bitcoin, Oct. 31, 2008, https://bitcoin.org/bitcoin.pdf, 9 pages.
Narayanan et al., "Bitcoin and Cryptocurrency Technologies," Princeton University Press, Feb. 9, 2016, 308 pages.
Ranvier, Justus, "BIPs (Bitcoin Improvement Proposals): Resusable Payment Codes for Hierarchical Deterministic Wallets", 2016, 18 pages.
Satoshi et al., "Connection Limits," Bitcoin Forum, Aug. 9, 2010, https://bitcointalk.org/index.php?topic=741.0; prev_next=prev, 2 pages.
UK Commercial Search Report mailed Feb. 28, 2017, Patent Application No. 1617951.7, 6 pages.
UK Commercial Search Report mailed Mar. 2, 2017, Patent Application No. 1617950.9, 5 pages.
UK IPO Search Report mailed Apr. 26, 2017, Patent Application No. 1617951.7, 7 pages.
UK IPO Search Report mailed Mar. 14, 2017, Patent Application No. 1617950.9, 5 pages.
User2203937 et al., "What is Bitcoin locking and unlocking script?" Bitcoin StackExchange, May 15, 2018, https://bitcoin.stackexchange.com/questions/75165/what-is-bitcoin-locking-and-unlocking-script, 4 pages.

(56) References Cited

OTHER PUBLICATIONS

Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.

Xu, Xiwei, "The Blockchain as a Software Connector", Conference: 2016 13th Working IEEE/IFIP Conference on Software Architecture (WICSA), Apr. 2016, 11 pages.

Antonopoulos, Andreas M.: "Mastering Bitcoin Unlocking Digital Cryptocurrencies," dated Sep. 17, 2024, 53 pages.

* cited by examiner

Figure 8

| 100.10 – Share Generation | |
|---|---|
| T1-100.10 | Transaction-ID |
| Version Number | Version number |
| 1 | Number of inputs |
| <Asset's BTC store, assume 100,000 satoshi> | Prev Trans Output |
| IDX-00 | Prev Trans Output index |
| Script length | Script length |
| Sig-Asset PubK-Asset | ScriptSig |
| Sequence number | Sequence number |
| 2 | Number of Outputs |
| 1,000 | Output value |
| Output Script Length | Output script length |
| OP_HASH160 <Redeem Script Hash> OP_EQUAL | Output script |
| 98,000 | Output value |
| Output Script Length | Output script length |
| OP_DUP OP_HASH160 <PubK-Asset> OP_EQUALVERIFY OP_CHECKSIG | Output script |
| LockTime | LockTime |

Figure 9

| 100.20 – Share Issuance | |
|---|---|
| T1-100.20 | Transaction-ID |
| Version Number | Version number |
| 1 | Number of inputs |
| T1-100.10 | Prev Trans Output |
| IDX-00 | Prev Trans Output index |
| Script length | Script length |
| Sig-Asset <Metadata Notification Address> | ScriptSig |
| Sequence number | Sequence number |
| 1 | Number of Outputs |
| 1,000 | Output value |
| Output Script Length | Output script length |
| OP_HASH160 <Redeem Script Hash> OP_EQUAL | Output script |
| LockTime | LockTime |

Figure 10

| 150.10 – On-sell Asset | |
|---|---|
| T1-150.10 | Transaction-ID |
| Version Number | Version number |
| 1 | Number of inputs |
| T1-100.20 | Prev Trans Output |
| IDX-00 | Prev Trans Output index |
| Script length | Script length |
| 2<br><Notification Address Secondary Holder><br><Notification Address Asset Holder><br><Sig-AssetHolder><br><Sig-Asset> | ScriptSig |
| Sequence number | Sequence number |
| 2 | Number of Outputs |
| 500 | Output value |
| Output Script Length | Output script length |
| OP_HASH160 <Redeem Script Hash> OP_EQUAL | Output script |
| 500 | Output value |
| Output Script Length | Output script length |
| OP_HASH160 <Redeem Script Hash> OP_EQUAL | Output script |
| LockTime | LockTime |

Figure 11

| 400.10 – Interim Transaction | |
|---|---|
| T1-400.10 | Transaction-ID |
| Version Number | Version number |
| 2 | Number of inputs |
| T1-100.20 | Prev Trans Output |
| IDX-00 | Prev Trans Output index |
| Script length | Script length |
| 1 <Notification-Address-Asset-Holder> Sig-Asset(SIGHASH_NONE) | ScriptSig |
| <Asset's BTC distribution, assume 51,000 satoshi> | Prev Trans Output |
| IDX-00 | Prev Trans Output index |
| Script length | Script length |
| Sig-Asset(SIGHASH_NONE) Pubk-Asset | ScriptSig |
| Sequence number | Sequence number |
| 2 | Number of Outputs |
| 1,000 | Output value |
| Output Script Length | Output script length |
| OP_HASH160 <Redeem Script Hash> OP_EQUAL | Output script |
| 50,000 | Output value |
| Output Script Length | Output script length |
| OP_DUP OP_HASH160 <PubK-Asset> OP_EQUALVERIFY OP_CHECKSIG | Output script |
| LockTime | LockTime |

Figure 12

| 400.10 – Complete Transaction | |
|---|---|
| T1-400.10 | Transaction-ID |
| Version Number | Version number |
| 2 | Number of inputs |
| T1-100.20 | Prev Trans Output |
| IDX-00 | Prev Trans Output index |
| Script length | Script length |
| 1 <Notification-Address-Asset-Holder> Sig-Asset<sup>(SIGHASH_NONE)</sup> Sig-AssetHolder <sup>(SIGHASH_ALL)</sup> | ScriptSig |
| <Asset's BTC distribution, assume 51,000 satoshi> | Prev Trans Output |
| IDX-00 | Prev Trans Output index |
| Script length | Script length |
| Sig-Asset<sup>(SIGHASH_NONE)</sup> Pubk-Asset | ScriptSig |
| Sequence number | Sequence number |
| 2 | Number of Outputs |
| 1,000 | Output value |
| Output Script Length | Output script length |
| OP_HASH160 <Redeem Script Hash> OP_EQUAL | Output script |
| 50,000 | Output value |
| Output Script Length | Output script length |
| OP_DUP OP_HASH160 <PubK-AssetHolder> OP_EQUALVERIFY OP_CHECKSIG | Output script |
| LockTime | LockTime |

NB: The amendments (compared to Figure 11) are shown in bold for clarity.

BLOCKCHAIN-BASED METHOD AND SYSTEM FOR SPECIFYING THE RECIPIENT OF AN ELECTRONIC COMMUNICATION

CROSS REFERENCE TO RELATED APPLICATIONS

This application is a continuation of U.S. patent application Ser. No. 18/095,996, filed Jan. 11, 2023, entitled "BLOCKCHAIN-BASED METHOD AND SYSTEM FOR SPECIFYING THE RECIPIENT OF AN ELECTRONIC COMMUNICATION," which is a continuation of U.S. patent application Ser. No. 16/344,295, filed Apr. 23, 2019, entitled "BLOCKCHAIN-BASED METHOD AND SYSTEM FOR SPECIFYING THE RECIPIENT OF AN ELECTRONIC COMMUNICATION," which is a 371 National Stage of International Patent Application No. PCT/IB2017/056584, filed Oct. 24, 2017, which claims priority to United Kingdom Patent Application No. 1617951.7, filed Oct. 25, 2016, and United Kingdom Patent Application No. 1617950.9, filed Oct. 25, 2016, the disclosures of which are incorporated herein by reference in their entirety.

SUMMARY

This invention relates generally to distributed ledger and blockchain technology, and more particularly to the use of blockchain technology for implementing systems for the automated control of computer-executed processes. An embodiment of the invention provides a solution for recording and controlling the ownership or control of an electronic asset via the blockchain, and for generating and effecting blockchain transactions in response to the current ownership data. The invention also provides a novel and advantageous solution for controlling and enabling the transmission of an electronic communication to a recipient. It utilises blockchain technology to facilitate the storage of a recipient address or identifier so that privacy and/or security can be enhanced, and enables the recipient to specify and/or alter the notification address stored on the blockchain. The invention is suited for, but not limited to, use with the Bitcoin blockchain.

In this document we use the term 'blockchain' to include all forms of electronic, computer-based distributed ledgers, including, but not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based electronic ledger which is implemented as a computer-based decentralised, distributed system made up of blocks which in turn are made up of transactions. Each transaction includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing, etc.) while being more versatile in their applications.

One area of current research is the use of the blockchain for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

Data relating to smart contracts needs to be registered, tracked and recorded. For example, it is necessary to record data relating to the owner(s) of an asset managed by a smart contract. This is particularly important in relation to smart contracts relating to assets which are owned by a number of entities, where the ownership is split into shares. In such cases, a transfer of ownership needs to be recorded in a secure manner. It is also important that relevant costs can be accrued against the asset and/or income generated and paid from it. Another important consideration is that it is often desirable to protect the identity of the real world parties involved.

In general, holding a tokenised asset against a blockchain means that there is a UTXO (unspent transaction output) that is allocated to the current asset holder and which determines the scale of that asset holder's current holding. This is encapsulated within the redeem script required to transfer the asset, and would generally be of the form:

X OP_CHECKMULTISIG (Metadata-A Metadata-B PublicK-A) Y

However, the information that is held within the blockchain is not this script, but rather a hash of the script. This means that the critical public key information is not available for public inspection.

In some cases, the income distribution is paid via the same tokenised commodity as the original asset e.g., when additional shares in a company are issued as the dividend. In such cases, the non-availability of the public key is not a problem as the income distribution can simply be paid to the same redeem script hash as the original issuance transaction.

However, in the more common scenario where the income distribution is paid as an alternative asset (for example BTC dividend against a share), then this lack of public key information means that, in accordance with the current state of the art, a separate, off-chain, database has to be maintained of the public keys associated with each issuance transaction. Whilst such a solution is clearly viable, it means that there are two systems (the blockchain and the off-chain database) which are maintaining the asset register. This injects complexity into the solution and the possibility that the two databases will become out of step with one another. It also requires an efficient storage arrangement.

Thus, it is desirable to provide a solution which, at least:
eliminates the requirement for this second database, and thus the risk and inefficient storage requirements that it entails, by enabling the automated determination of where the income should be paid to
is able to pay that income in such a manner that ensures that only the current asset holder is in a position to claim those funds
provides a generic mechanism to generate actions and technical responses (e.g., in response to income generation) in proportion to the current ownership of an asset represented and/or referenced via a blockchain
uses blockchain transactions to allow the secure, automated transfer of an asset and record those transfers and payments on the blockchain, thus providing benefits such as a tamper-proof record of events and data
enables the protection of identities of 'real world' parties such as asset owners; the solution should enable or facilitate anonymity
provides a solution for enabling and controlling electronic communications which need to be sent to "unknown" parties.

Such an improved solution has now been devised. The present invention provides at least these technical effects discussed above. The invention is defined in the appended claims.

Therefore, in accordance with the invention there may be provided a control method and corresponding system. The method may control the transmission of an electronic communication. It may be a method of establishing an electronic communication channel between two or more parties.

Additionally or alternatively, the invention may be arranged to facilitate and/or enable the completion of an incomplete blockchain transaction. Thus, the invention may be described as a method to control or influence the validity and/or propagation of a blockchain transaction on a blockchain network.

Herein, the terms "communication," "notification," and "alert" may be used interchangeably.

The invention may provide a method of controlling and/or generating an electronic communication. Additionally or alternatively, the invention may provide a solution for determining the destination of an electronic communication/transmission. It may be a blockchain-implemented solution. The invention may be a method/system arranged to enable (electronic, off-blockchain) communication with an anonymous recipient, or pseudo-anonymous recipient. This recipient may be an asset owner or controller, for example, although the invention is not limited in this regard. The communication may be sent using information stored, or "embedded," within a sequence of blockchain transactions. The invention may be described as a method of specifying and/or determining the destination of an electronic communication via a blockchain.

The method may comprise the step: sending a signal to an address. The address may be a notification address. The signal may be called or serve as a (electronic) notification or communication.

The invention is not limited with regard to the context, purpose or content of the notification. The notification may be provided as metadata within an unlocking script associated with an input of a transaction ($Tx_1$) on a blockchain. The term "identifier" may be used interchangeably with "address." This transmission step may triggered by an event. The event may be specified, determined or influenced by a smart contract. Transmission (sending) of the notification may be performed by a computer-based resource. It may be performed as at least part of an automated process.

The notification may serve as a request and/or trigger for completion of the incomplete transaction. The method may comprise the step of completing the incomplete transaction. Completion may comprise the provision of a cryptographic signature.

The unlocking script may be provided in order to spend an output from a further transaction ($Tx_2$) on the blockchain. (This may be a "preceding" transaction on the blockchain in the sense that an input of transaction $Tx_1$ may spend an output of transaction $Tx_2$).

Thus, the invention may comprise the step of requiring the provision of a notification address in an unlocking script in order to unlock a locking script. This step may be repeated. Thus, a sequence of notification addresses may be required and supplied. A notification address may be required in order to spend each output in a chain of blockchain transactions. This allows the provision of a different addresses over time. Thus, the invention enables and facilitates changing of the recipient address for the notification.

The input of the transaction ($Tx_1$) and/or the output of the further transaction ($Tx_2$) may be associated with a tokenised asset represented on, or referenced via, the blockchain. This token may be referred to as a "coloured coin."

The electronic notification may comprise:
an incomplete or complete blockchain transaction, and/or information relating to an incomplete or complete blockchain transaction.

It may be incomplete in the sense that it is missing a piece of required data.

It may comprise information relating to the location of the complete/incomplete transaction, or how to access it.

The notification address may be associated with an asset or resource represented on the blockchain, or a controller of an asset or resource represented on the blockchain. The controller may be the same or a different entity from the actual ("real world") owner of the asset.

The method may further comprise the step of:

traversing the blockchain to identify the transaction ($Tx_1$) or further transaction ($Tx_2$). The skilled person would understand how this traversal would be performed as per known techniques.

The method may comprise the step of:

submitting a transaction to a blockchain, wherein the transaction ($Tx_1$) comprises an unspent output (UTXO) which includes a redeem script that requires the provision of a notification address within the metadata of an unlocking script in order to spend the output (UTXO).

The unspent output (UTXO) may transfer ownership of, or otherwise relate to, a tokenised asset represented on, or referenced via, the blockchain.

The notification address may be provided as a parameter in the unlocking script of the transaction ($Tx_1$). It may be provided as a second parameter.

The method may comprise the step of using a redeem script to ensure that a notification address has been provided in the unlocking script. The redeem script may comprise a value indicating how many notification addresses must be supplied by the unlocking script.

A plurality of notification addresses may be provided within the unlocking script.

The notification address may be a network address, a cryptographic key, a uniform resource locator (URI), email address or any other address or identifier which can be represented in the metadata of a script and used as a destination for an electronic communication. Thus, the notification address may serve is an identifier for the recipient of the notification/communication.

At least one step of the method may be performed by an automated computing resource or agent. This may be called a "bot" or "oracle."

The method and/or system may be substantially as described below in the section entitled "Notification Address Embedded Within the Blockchain."

The invention may also provide a computer-implemented system arranged and configured to perform the steps of any embodiment of the method described herein.

The system may comprise:
a blockchain;
at least one autonomous computing agent arranged and configured to:
traverse the blockchain; and/or
generate and or send the electronic notification.

Any feature described in relation to the method may also be applicable to the system and vice versa.

The invention may be substantially as described in the illustrative embodiment described in the following examples, description and figures. These and other aspects of the present invention will be apparent from and elucidated with reference to, the embodiment described herein.

BRIEF DESCRIPTION OF THE DRAWINGS

An embodiment of the present invention will now be described, by way of example only, and with reference to the accompany drawings, in which:

FIG. 8 provides blockchain transaction number 100.10 which, in relation to the example provided below, could be used to generate shares in the asset represented on the blockchain.

FIG. 9 provides blockchain transaction number 100.120 which, in relation to the example provided below, could be used to issue shares of the asset to a recipient. Note that the notification address is specified as a requirement in the ScriptSig. This forces the recipient (i.e., the asset owner or controller) to provide a notification address as metadata in an unlocking script when "claiming" the shares via an input in a subsequent transaction.

FIG. 10 provides blockchain transaction number 150.10 which could be used to transfer ownership of part of the asset to a recipient. In this case, the current asset controller retains part of the asset and assigns or transfers the other portion to one or more other parties.

FIG. 11 provides incomplete blockchain transaction number 400.1 which could be generated in relation to the example provided below.

FIG. 12 provides blockchain transaction number 400.10 which is the completed version of the incomplete transaction shown in FIG. 11, as modified by the asset controller.

DETAILED DESCRIPTION

Figure 1:
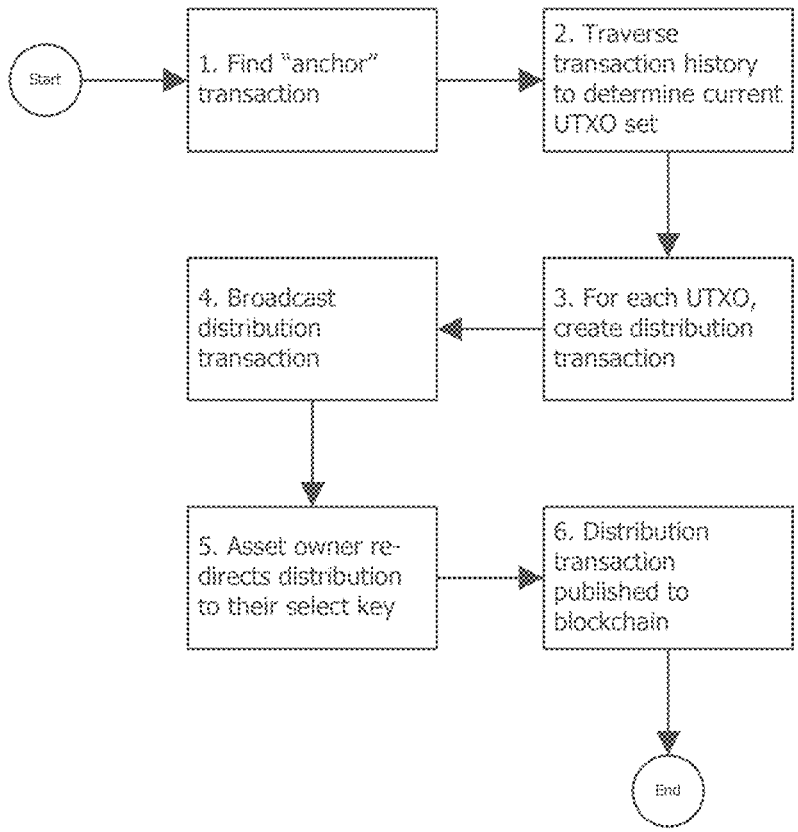
FIG. 1 provides an overview of an illustrative embodiment of the invention.

The present invention provides a generic solution that allows the control of secure transfers of digital entities via inputs and outputs of blockchain transactions. In the examples provided herein, the invention is discussed for illustrative purposes in the context of paying income or accrued costs against a blockchain-registered asset according to the terms of an underlying investment contract e.g. in direct proportion to how the ownership of that asset has been split. For example, if an asset has been split into 100 shares, then the income to be paid would be calculated per share.

However, it is important to note that the invention is not limited to such use case scenarios and provides a more generic transfer-control solution and notification solution which can be utilised to advantage in a variety of applications and contexts.

Key Terms

This technical specification uses the following terms throughout to define key concepts and components.

| Name | Type |
| --- | --- |
| Asset | The asset is an actor that represents something that can apportion ownership to one of more Asset holders in variable amounts. The Asset is both a private key plus an agent as defined below. These amounts can be simple percentages (e.g. 5%) or units (e.g. 100 units). |
| Agent/oracle | The 'agent' is a software-implemented resource which performs automated actions on behalf of the asset. The agent may be referred to as an "oracle" or a "bot." Essentially, the agent is a software component which is programmed to implement the terms of the smart contract, respond appropriately to pre-defined triggers, evaluate conditions using inputs from sources which may be off-chain etc. As such agents are known in the art and readily understood by the skilled person, and are not the focus of the present invention, their implementation are not described in detail herein. |
| Asset Holder | The asset holder is an actor that represents something that currently holds a proportion of an Asset. The holder may be referred to as a "controller" or "owner" |
| Secondary Asset Holder | The secondary asset holder is an actor that represents something that holds a proportion of an Asset which is gained from a transaction other than the original issuance transaction (e.g. the on-sell of the asset). |
| Repository | The repository is an actor that represents the entity responsible for the storage (and potentially on-going maintenance) of the Contract document defining the payment schedule associated with the asset. |
| Contract | The Contract is the document that contains the formal definition for how to determine the payments, and the schedule associated with the payments for this asset. This is a smart contract, as is known in the art. It may also (depending on the implementation method used) hold detailed of the current ownership of the asset. |

As shown herein, the invention provides an automated, secure and robust mechanism which allows at least the following:
 the ability to determine the current ownership of an asset from a blockchain (such as, for example, the Bitcoin blockchain);
 the ability to control transmission of electronic communications to unknown parties relevant to the asset; and
 the ability to pay income generated by the asset in proportion to the current ownership of the asset.

In the latter two cases, this process can used to advantage where the asset maintains a separate database of ownership, or where the ownership is hidden by the blockchain via the use of (payment) addresses.

The invention provides at least two advantageous aspects:
1. The ability to make payments via a blockchain to owners of an asset where the owner remains unknown and anonymous to the asset.
2. The ability to notify anonymous owners using information stored within a sequence of blockchain transactions. This aspect is the focus of the present application.

Determining Current Ownership of an Asset Represented on a Blockchain

In order to apportion costs/income against an asset represented on the blockchain, it is essential to be able to determine the current ownership of that asset. There are two mechanisms one could use to achieve this:
 The ownership can be maintained in a separate register off-chain maintained by the asset (and updated by forcing transfers to be counter-signed by the asset). This mechanism is ideal for regulated assets where formal "Know Your Customer" rules apply.
 The ownership can be determined by scanning the transactions on the blockchain to dynamically generate the current ownership list. It should be noted that this approach does not determine the ownership per se but rather it identifies the Bitcoin addresses that are responsible for the asset. This may be referred to as the "asset controller," which may or may not be the actual owner. This blockchain-traversal technique is used by the present invention.

Generating Ownership-Related Actions: E.g. Calculating and Paying Income

In order to pay income from the asset in proportion to the current ownership of the asset:
 the asset must have the ability to determine the current ownership;
 the asset must be able to record the total income for a given period;
 the asset must be capable of dividing the income between the current ownership;
 the asset must be capable of netting costs from the income;
 the asset must be capable of holding income where previous costs have not been paid; and
 the asset must be capable of triggering the payment of the income such to the current asset holders.

This income can be rolled up at the end of a time-period (e.g., every six months) or as it is generated (e.g., immediately). Depending on the nature of the contract, the same conditions would allow for pro-rata payment of income with some contracts only allowing payment for a period to the current holder.

Technical Solution

The technical solution provided by the invention provides a mechanism by which the controller of an investment or asset, via an agent and a smart contract, can generate a set of payment transactions to both re-coup its costs or pay income. The solution relies on an automated oracle process (or multiple oracle processes depending on the structure of the underlying contract) being triggered by an off-chain condition. For example, this condition might be a date on which to pay returns. Once this trigger condition trips the oracle will:
 calculate the total payment amount for the asset as a whole;

calculate the individual payments across the current ownership split for the asset based-on the payment rules (for example, pro-rata); and create payment transactions for each of the individual asset holders.

FIG. 1 shows the basic flow of how the technical solution determines the individual payments to make.

The steps in the flowchart of FIG. 1 are defined in more detail in the subsequent sections:

| Step | Details |
|---|---|
| 1 | Find 'anchor' transaction<br>This specifies to the oracle the point to start the traversal of the transaction history to determine the current ownership of the assets. The anchor may also be referred to as the "issuance transaction"<br>See section 'Traversing from the issuance transaction' for more information. |
| 2 | Traverse transaction history to determine current UTXO set<br>This looks for all the "spends" of the assets, starting from the point of issuance, to determine the current unspent output UTXO (which determines the current location/ownership of the assets).<br>See section 'Traversing from the issuance transaction' for more information. |
| 3 | For each UTXO, create distribution transaction<br>This step simply ensures that steps 3 through 6 are repeated for each UTXO discovered in step 2 above. A 'raw' distribution transaction is created and broadcast in an incomplete state (it is missing a key transaction signature). The distribution transaction will ultimately be used to transfer funds to the specified recipient, once the distribution transaction has been completed.<br>See section 'Creating the distribution payment' for more information. |
| 4 | Broadcast distribution transaction<br>This steps broadcasts the incomplete transaction to interested parties. Since it is known that only the current controller/owner of the asset can complete the transaction and claim the funds (because of the requirements specified in the locking script of the output), this can be published through any open channel. However, it cannot be broadcast through the blockchain itself, for reasons explained below. |
| 5 | Asset owner re-directs distribution to their select key<br>This step allows the current asset controller/owner to re-direct the funds from the broadcast transaction to their selected private key.<br>See section 'Re-directing the distribution payments' for more details. |
| 6 | Distribution transaction published to the blockchain<br>This final step locks the completed and re-directed transaction to the blockchain in the normal manner. |

Traversing the Blockchain From the Issuance Transaction

Figure 2:
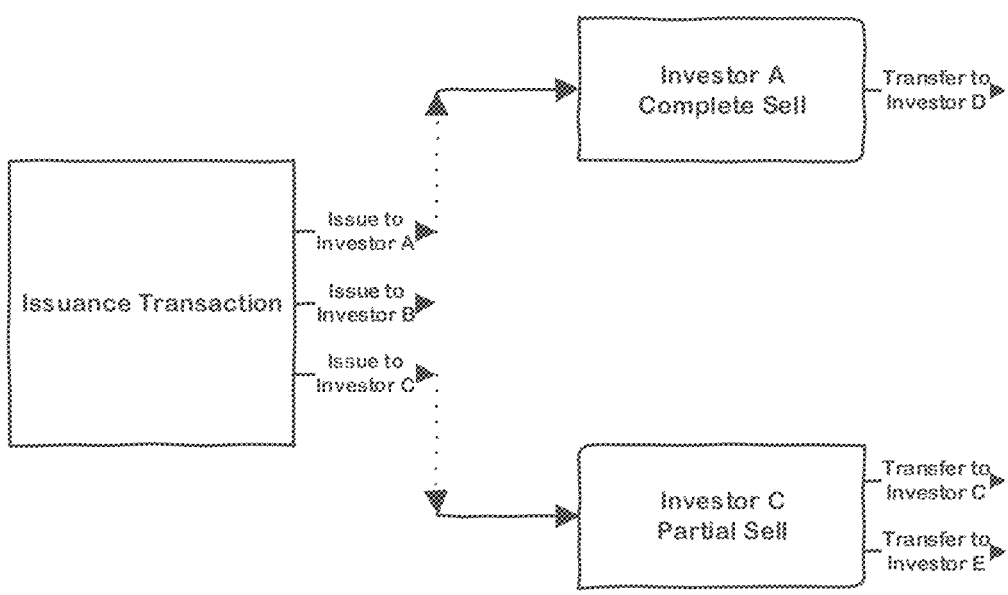
FIG. 2 provides an illustration of the traversal logic which is employed when iterating over the blockchain to determine the current ownership of the asset(s).

In order to determine the current location (ownership) of the shares within the asset, the relevant oracle needs to be able to traverse the blockchain, starting from the original issuance transaction to determine where the shares of the current asset currently reside. The issuance transaction is referred to as the "anchor transaction" in FIG. 1. FIG. 2 shows a sample chain of transactions which might be used during such a traversal. Essentially, this process involves moving from transaction to transaction on the blockchain, following a trail, until the oracle finds a UTXO relating to the asset. As this output has not been spent, it indicates that the asset controller that spent the last input on the asset must still be the controller. Therefore, the traversal process can halt at this transaction.

Each individual Issue or Transfer transaction output has an associated Redeem Script. From the fact that the transaction output is unspent, the oracle can determine which Redeem Script was used to spend the output from the previous transaction and therefore 'owns' which proportion of the asset at any point in time.

Creating the Distribution Payments

Figure 3:
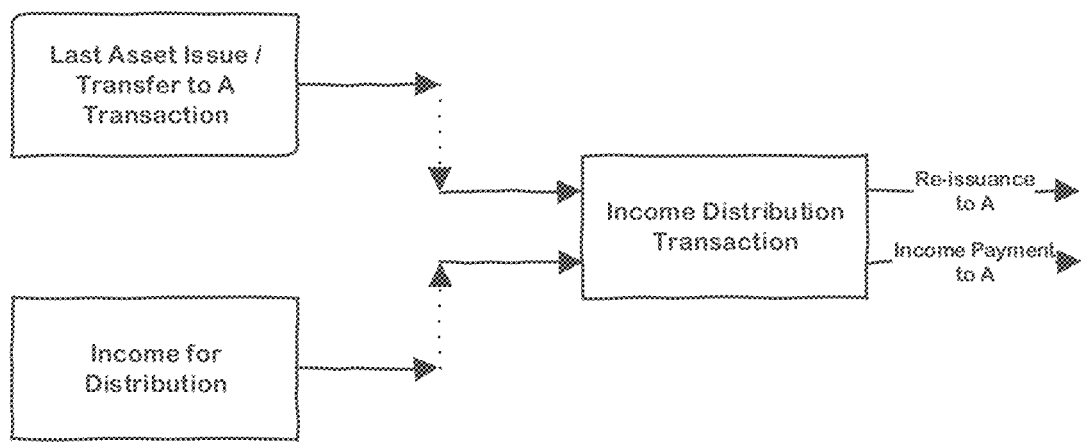
FIG. 3 provides an illustration of the transaction output which is required in accordance with an embodiment of the invention.

By knowing the redeem script, the income distribution transaction can make use of the SIGHASH_NONE capability to allow the output to be redirected, but only in a manner that the controller of the Redeem Script can change. To do this, the distribution transaction needs to be constructed as illustrated in FIG. 3.

The distribution transaction will have two outputs:

1. an output which transfers (re-issues) back to the current controller so that next time the traversal process is performed, the same controller is determined to be the current one; and 2. an output which transfers some electronic funds to the controller.

The re-issuance output can be constructed since it can simply replay (i.e. copy) the Redeem Script hash from the previous issuance/transfer transaction.

However, it is impossible to construct the distribution transaction in one step based on the number of signatures that are required and because, at the point of construction, the locking script for the Income Payment to A cannot be constructed.

Figure 4:
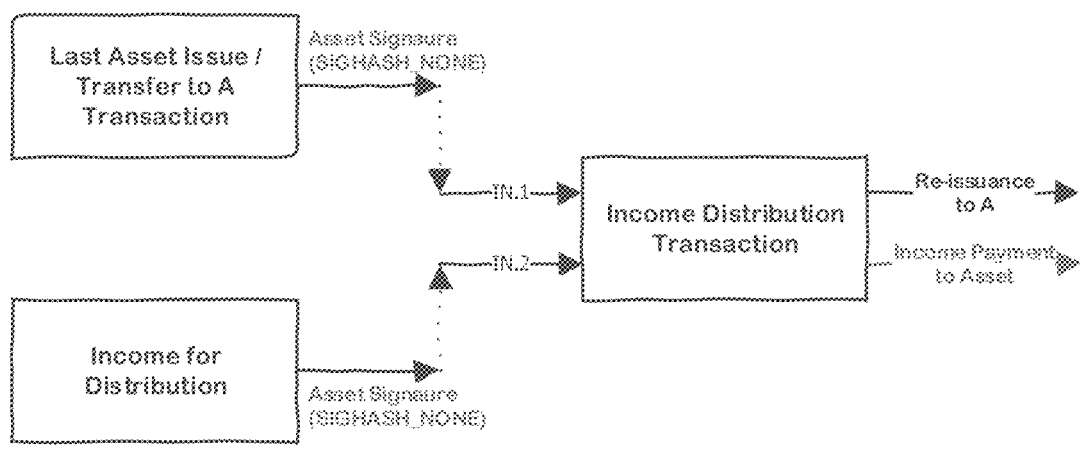
FIG. 4 provides an illustration of the construction of the initial, incomplete blockchain transaction.

To solve this, the distribution transaction is originally constructed and broadcast in the format shown in FIG. 4.

By setting the signature hash on the inputs to SIGHASH_NONE, then either one of the outputs can be changed. However, by locking in the last issuance transaction, only the legitimate owner of the asset can make the change since they are required to sign the input (and would obviously not do so unless it was in their interests). It should be noted that there is no necessity for any signature to be supplied on the Last Asset Issue/Transfer to A Transaction. It is shown in FIG. 4 on the assumption that the asset issuer is a counter-signatory for any transfer transaction; if they are not then this transaction is simply bound using the signature on the Income for Distribution which achieves the same effect.

Re-Directing the Distribution Payments

Figure 5:
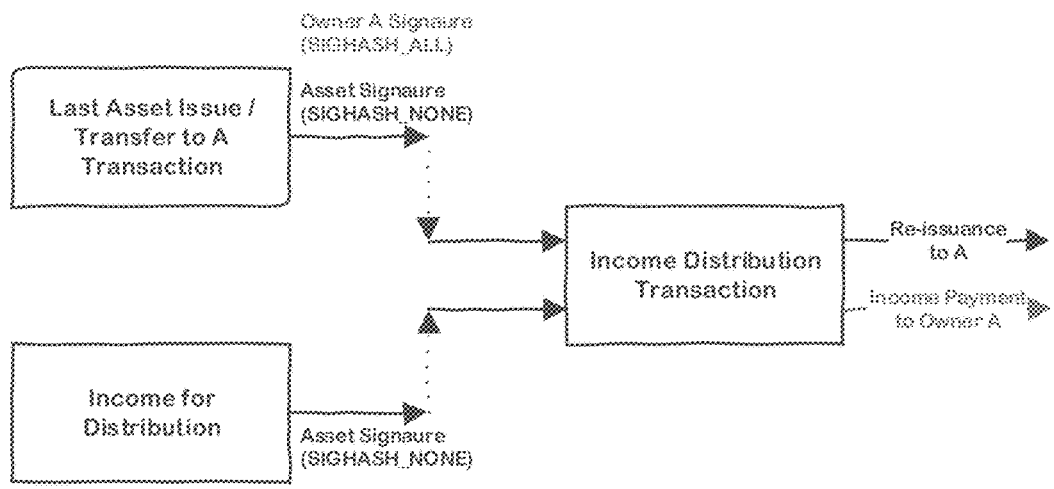
FIG. 5 provides an illustration of the incomplete transaction of FIG. 4 after it has been amended and completed by the asset controller.

When the current Asset owner picks up the incomplete, template transaction, they determine that it is in their best interests to complete the transaction which they do by signing the Last Asset Issue/Transfer to A Transaction input after changing the income payment transaction to pay this income to themselves. This amended, complete transaction is illustrated in FIG. 5. As the transaction is now complete it can be mined.

Thus, the outcome has been achieved without there being any requirement for the Asset to know anything about the underlying owner of the asset other than their ownership share that was contained within the blockchain record itself.

The Need for Notification

As described above, the payment distribution transaction is initially created in an incomplete form. It then needs to be communicated somehow to the asset controller(s) so that they are aware of its existence and can make the necessary modifications to complete it and submit it to the blockchain.

However, the incomplete transaction cannot be broadcast via the blockchain itself. This is because, by default, the blockchain propagation nodes will not propagate incomplete transactions across the network. As the original version of the distribution transaction is incomplete (it is missing a signature), it is unlikely that the controller/owner will be able to pick up the incomplete transaction and apply a signature prior to it being dropped by the network. Whilst this does not impact the ownership of the asset, it does mean that the relevant parties do not get paid the income that they are owed.

To resolve this, there needs to be a channel that can be used to broadcast the incomplete transaction to interested parties (or at least make them aware of its existence and/or location).

There are various possible methods to resolve this, including:

- The contract could publish a 'broadcast' channel as part of the contract upon which all incomplete transactions will be broadcast with owners of the assets listening to that channel to determine transactions of interest and reacting to them. This publish/subscribe mechanism is a standard IT feature.
- Upon sale or other transfer of the asset, the new asset owner/controller locks a notification address into the sale transaction. This enables a communication channel to be set up without any other information being known about the asset owner/controller. The asset will then use this private channel to send the incomplete transaction to the current owner, or notify them that the transaction is available from an accessible location e.g. for download and subsequent completion.

Neither of these solutions impact or affect the first aspect of the invention as described above, in that the asset is still unaware of the ownership of itself other than from information held upon the blockchain itself. In the following example, the transactions make use of the second option for transaction notification. This notification technique forms a second, novel aspect of the invention and offers privacy or anonymity of the transaction information.

Notification Address Embedded Within the Blockchain

This novel and advantageous aspect of the invention provides a solution to the propagation problem identified above by enabling the ability to embed a notification address within the blockchain transaction. The notification address can then be used for subsequent notifications.

The notification can take any suitable form, such as for example an email. In such cases, the email would be sent to the email address that has been embedded in the previous transaction. However, other forms of electronic communications known in the art also fall within the scope of the invention. Essentially, the identifier which is captured in the initial transaction serves as the address or location to which notifications will be sent.

This section explains how this model operates and is the focus of the present application. It should be noted that this notification technique can be used to advantage as a solution to a problem in its own right, and in respect of a wide variety of contexts and applications, independently from the first aspect of the invention described above.

This solution means that a communication can be sent to a recipient without the need for any further information to be supplied or known. The invention therefore provides an enhanced alert, notification or communication technique which preserves or enhances privacy and security. No additional information about the recipient is required other than the address that is provided in, and then extracted from, the transaction script. This lends itself to being implemented by an automated process such as a bot.

Transmission of the notification to the specified address may be triggered by an event. The event may be specified in, or influenced by, a smart contract.

The notification can simply be a signal sent to the address, and/or may contain predetermined content. Thus, a desired, informative message can be transmitted. Additionally or alternatively, receipt of the notification may serve as a signal to an automated process and thus trigger a pre-determined or programmed response e.g. to supply a signature to the transaction, or perform some other action.

The invention is not limited with regard to the content of the notification message that is dispatched to the embedded address. The notification may, in some cases, include a copy of the incomplete transaction. In the present example, though, the role of the notification address is to ensure that the relevant interested actors—which may be a human or computer-based resource—can be notified or alerted to the need to apply their signatures (and make other amendments) to a given target transaction as the author of that target transaction has no other information about them. In effect, then, the invention enables the fulfilment, completion of a future blockchain transaction. Upon provision of the necessary signature(s), the partial, invalid transaction is converted into a viable, valid transaction that can be accepted by the blockchain. Therefore, the invention solves the problem of how to control, facilitate and/or enable the validity of a blockchain transaction and its propagation on a blockchain network.

Figure 6:
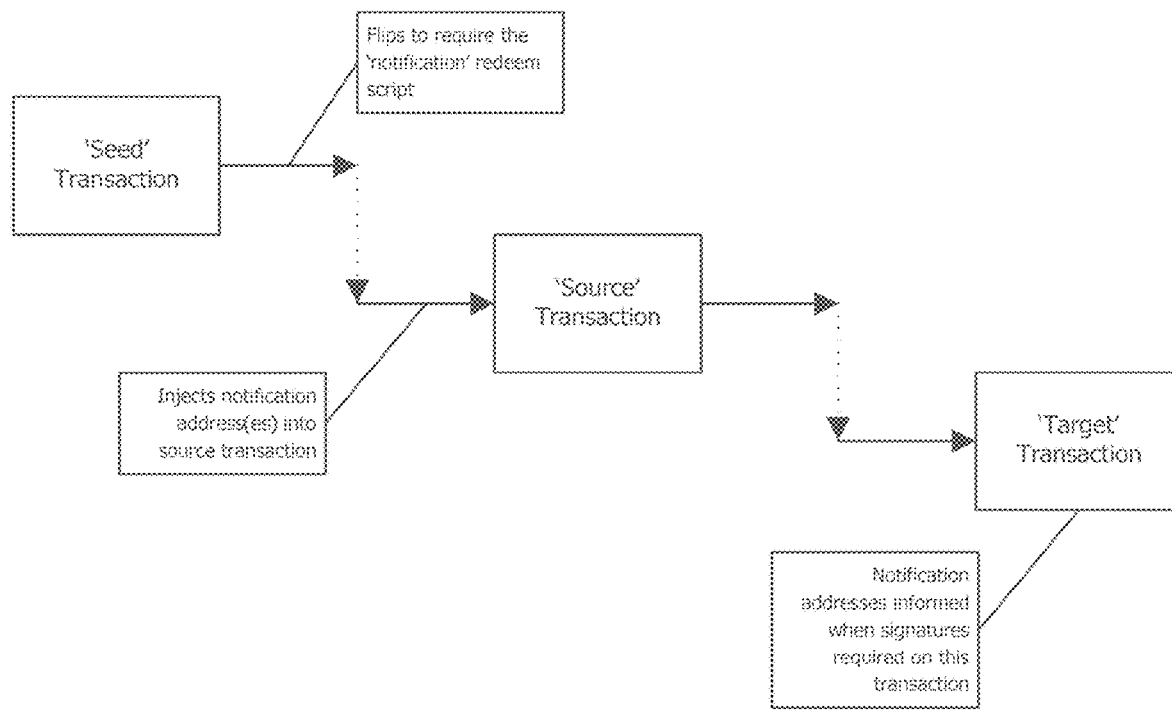
FIG. 6 provides an illustration of an embodiment of the invention, in which a notification is sent to the asset controller to inform them that there is an incomplete transaction which needs their attention and modification.

In order to do this, a 'seed' transaction needs to be created that forces the capture of notification address in all subsequent transactions. This would usually be prior to an issuance transaction (for a standard tokenised transaction). This issuance or 'source' transaction now requires additional attributes to be supplied on the unlocking script that contain the notification addresses. The full flow of this process is shown in FIG. 6.

Notification Redeem Script

The key format for the unlocking script is as follows:

```
<count of notification addresses>
<notification address #1>
<notification address #2>
...
<notification address #n>
```

```
<signature #1>
...
<signature #n?>
```

As can be seen from the above structure, the elements shown in the box represent a standard script input, but the prefix is novel. This prefix takes the form shown here:

```
OP_DUP
OP_IF
   OP_1SUB
   OP_SWAP
   OP_DROP
   OP_DUP
OP_ENDIF
OP_IF
   OP_1SUB
   OP_SWAP
   OP_DROP
   OP_DUP
OP_ENDIF
OP_IF
   OP_1SUB
   OP_SWAP
   OP_DROP
   OP_DUP
OP_ENDIF
OP_IF
   OP_1SUB
   OP_SWAP
   OP_DROP
OP_ENDIF
OP_VERIFY
<Script remainder e.g. signature verification>
```

This particular example means that the <Count of notification addresses> can range from 1 to 4, but the structure can be extended to support a different maximum if required. This script prefix effectively drops the relevant notification addresses from the stack, and then checks to make sure that the number of notification addresses matches the number that should have been there.

Use Case Model

Figure 7:
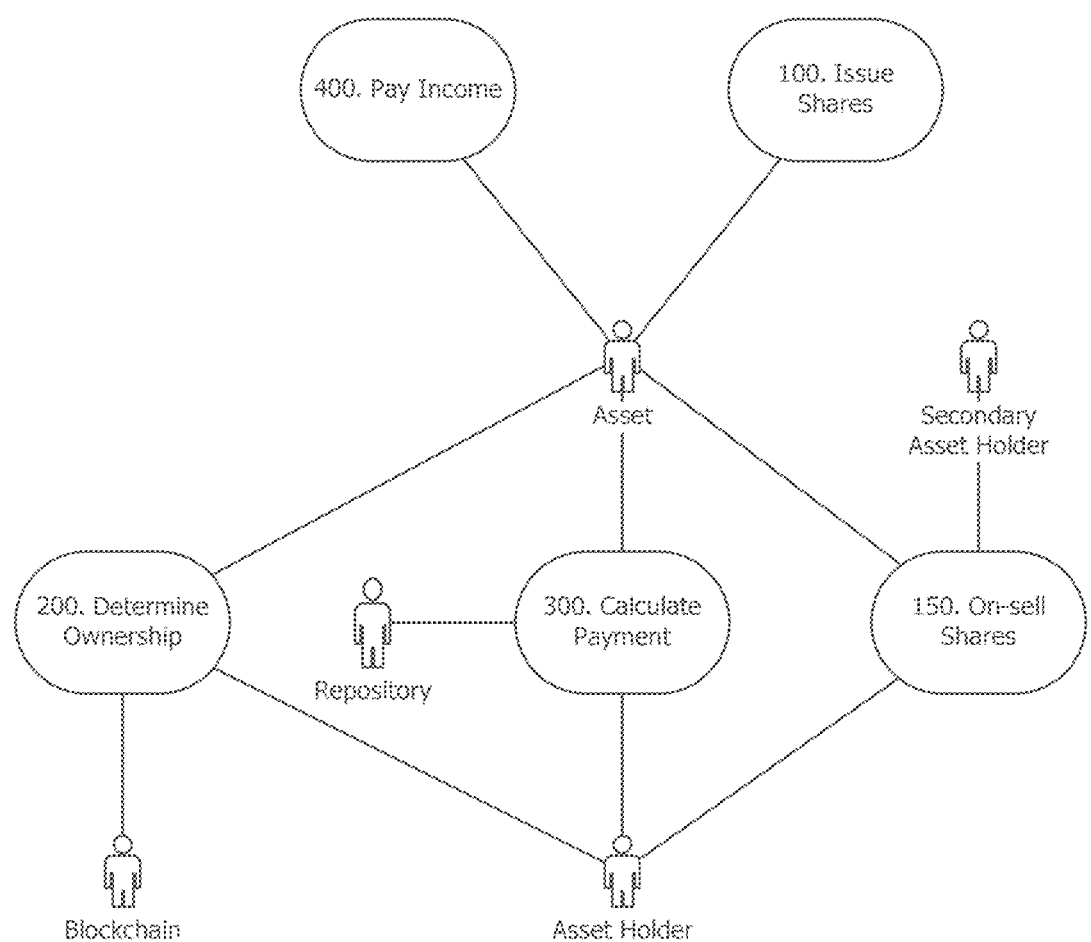
FIG. 7 shows an illustration of a use case model in accordance with an embodiment of the invention.

The model provided in FIG. 7 shows the key use cases involved within the non-debt lending model.

[100] Issuance of Shares

The Asset needs to issue shares in itself to the appropriate Asset Holder, ensuring that it captures the notification address for that entity during the issuance. The primary actor in this is the Asset.

Main Success Scenario:

This step is required only where the current holder's notification details are maintained on the blockchain itself.

| Step | Details |
|---|---|
| 100.10 | Shares Generated<br>In this step, the Asset splits their stock of BTC into UTXO's of the correct amount for subsequent issuance to an individual Asset Holder (the step performed in 100.20 below).<br>The transaction is made to a pay to script hash address controlled by the Asset but which allows the injection in step 100.20 of the new Asset Holder's notification address. |
| 100.20 | Shares Issued<br>In this step, the Asset takes each individual fragment generated in step 100.10 above and issues it to the appropriate Asset Holder locking that holder's notification address into the issuance instruction within a second parameter to the unlocking script. |

The Share Generation transaction is shown in FIG. 8 as Transaction 100.10

The full redeem script for Output 1 of transaction 100.10 is shown below.

```
OP_DROP        OP_CHECKSIG
```

The Share Issuance transaction is shown in FIG. 9 as Transaction 100.20

The full redeem script for Output 1 of transaction 100.20 is shown below.

```
OP_DUP
OP_IF
   OP_1SUB
   OP_SWAP
   OP_DROP
   OP_DUP
OP_ENDIF
OP_IF
   OP_1SUB
   OP_SWAP
   OP_DROP
   OP_DUP
OP_ENDIF
OP_IF
   OP_1SUB
   OP_SWAP
   OP_DROP
   OP_DUP
OP_ENDIF
OP_IF
   OP_1SUB
   OP_SWAP
   OP_DROP
OP_ENDIF
OP_VERIFY
OP_CHECKMULTISIG  OP_2  <PubK-AssetHolder>
<PubK-Asset>  OP_2
```

This example redeem script allows a subsequent on-sell to transfer ownership to up to four buyers. If the purchase relates to more than four buyers, then multiple transactions would be required. It should be noted that it is clearly possible to extend (or restrict) the potential number of new purchasers by repeating (or reducing) the 'if' block within the above script.

On-Sell of Shares

The Asset Holder needs to on-sell a proportion of its holdings to another interested party. The primary actor in this is the Asset Holder.

Main Success Scenario:

| Step | Details |
|---|---|
| 150.10 | Capture notification address for each purchaser<br>The current asset holder captures the notification address for the new purchaser through any mechanism that they choose. |

| Step | Details |
|---|---|
| 150.20 | Create re-sell transaction template<br>The current asset holder constructs a re-sell transaction and captures the order of the transaction outputs.<br>The order of the created transaction outputs is used to structure the unlocking script as follows:<br><Number of transaction outputs><br>Notification Address for TxOut-0><br>Notification Address for TxOut-1> //if required<br>Notification Address for TxOut-2> //if required<br>Notification Address for TxOut-3> //if required<br><Sig-AssetHolder> |
| 150.30 | Asset counter-signs template transaction<br>The Asset provides the second signature to the re-issuance transaction. |
| 150.40 | Transaction published & mined<br>The transaction is then published to the blockchain and subsequently mined into a block. |

This creates a number of key features that are necessary to support the underlying income distribution.

The sale can only be to a maximum of four new holders (e.g., a four output transaction, but can be any number from 1 to 4).

If the sale includes the retention of some of the shares, then only three new holders can be supported since only of the slots is taken for the re-allocation back to the current holder.

Transaction 150.10

In example transaction 150.10 provided in FIG. 10, the transaction implements a partial sell with the current asset holder retaining a stake and selling one other stake to a new holder. It should be noted that in a real-world scenario it is possible that an additional input to cover the mining fee may be required. This has been ignored in the template of FIG. 10, transaction 150.10 to improve readability.

The redeem script for output 1 of transaction 150.10 (FIG. 10) is the same as that for transaction 100.20 (FIG. 9) with the exception that the public keys are: <PubK-SecondaryAssetHolder> and <PubK-Asset>.

This redeem script for output 2 of transaction 150.10 (FIG. 10) is completely identical as that for transaction 100.20 (FIG. 9).

[200] Determination of Ownership

The Asset needs to determine how to allocate the income for payment to the current asset holders even though it is unaware of their identity. The primary actor in this action is the Asset.

Main Success Scenario:

| Step | Details |
|---|---|
| 200.10 | Determine Current Asset Allocation<br>In this step, the Asset traverses the pool of UTXOs from their original issuance transaction generated by the asset.<br>Where the original UXTO has been spent (i.e. the asset has been transferred again), then the outputs from this new transaction is checked according to step 200.10.<br>In performing this traversal, the notification address from the 'spent' input is recorded.<br>Each original issuance UTXO is traversed until a set of current issuance blocks is determined, plus the notification address and redeem script for that output. |

Calculate Payment

Here, the Asset wishes to calculate the amount of income that should be paid to its current owners. The primary actor for this action is the Asset.

Main Success Scenario:

| Step | Details |
|---|---|
| 300.10 | The Asset pulls in all the information for the period to calculate the income due.<br>Note: this may be zero.<br>Note: the mechanism used will be specific to the nature of the asset itself and formally defined within the associated contract document. |
| 300.20 | The outputs from the preceding step is allocated on a per share basis according to the terms of the contract (for example by dividing the output value with the number of shares in existence).<br>The rounding rules will tend to be defined within the associated contract document but will normally be down for income due. |
| 300.30 | The per-unit apportionment derived in step 300.20 is now allocated on a per-holding basis through a simple multiplication using the holding allocation derived in use case 200. |
| 300.40 | Use case 400 is now performed for each individual holding identified out of step 300.30 |

Paving the Income

Here, the Asset wishes to pay income to its owners in proportion to their ownership. The primary actor is the Asset.

Main Success Scenario:

| Step | Details |
|---|---|
| 400.10 | The Asset generates a transaction with two transaction inputs and two transaction outputs as shown in FIG. 4. The transaction inputs are: Asset issuance transaction (or last asset re-assignment), signed by the Asset with a SIGHASH_NONE flag set Income distribution amount, signed by the Asset with a SIGHASH_NONE flag set This means that there is a signature missing from the first input and allows anyone to change the outputs of this transaction. However, because of the missing signature, this is effectively changed to a model that say that only the remaining signatory has the practical ability to change the output of the transaction. In turn, this has allowed the Asset to create a payment transaction without knowing where to send the payment, but certain that it will only get collected by the authorised recipient. The transaction outputs are: Transaction income distribution input (less the mining fee) paid to the Asset's public key hash Asset issuance transaction, paid back to the same place as the input. |
| 400.20 | Using the notification address for this redeem script (as determined during use case 200), the incomplete transaction is pushed to the current Asset Holder. |
| 400.30 | Upon receipt, the Asset Holder changes the destination of the second output to the Asset Holder's public key hash (e.g. paid to themselves) and then provides the second signature to the asset issuance transaction with a standard SIGHASH_ALL flag set. Note that the re-direction of the income distribution output can be to any address that the Asset Holder requires and is not restricted to being their public key hash. |
| 400.40 | The Asset Holder then publishes this transaction to the blockchain for it to be accepted and mined. |

Transaction 400.10—Interim (Incomplete) transaction is shown in FIG. 11. Transaction 400.10—final (complete transaction) is shown in FIG. 12. In FIG. 12, the amendments are shown in bold for clarity.

Example Scenario: Asset Share Capital

The main type of scenario that is supported by this model is the traditional share capital for an asset such as a company. The company (NewCo plc) will issue a fixed amount of shares (1,000) that can be freely traded, with income paid out on a periodic basis (annually). As the income distribution represents the profit of the company, there is no requirement to support the collection of costs from the asset holder base (profit has already had the costs netted off from them).

Key Benefits of the Invention Include:

The invention enables autonomous activity against a blockchain, allowing for entities that are created where income/costs can be paid without having to maintain (except for regulatory reasons) a separate off-chain database of ownership.

The invention enables a notification address or identifier to be embedded within a transaction, and specifically within the script of a transaction.

Thus, the invention provides enhanced privacy, security and communication. It is particularly advantageous in applications relating to the control and recordal of a transfer of assets and/or funds via a blockchain.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A method comprising:
   traversing a blockchain transaction history to identify a first transaction comprising a current unspent transaction output (UTXO);
   reviewing a previous transaction to the first transaction to determine a current owner of an asset associated with the current UTXO, the previous transaction comprising a hash of a redeem script;
   generating a distribution transaction for the current UTXO, the distribution transaction based at least in part on the hash of the redeem script of the previous transaction; and
   broadcasting the distribution transaction, wherein the distribution transaction can only be signed and completed by the current owner of the asset associated with the current UTXO, wherein the distribution transaction is broadcasted through a broadcast channel separate to the blockchain, and the broadcast channel is established by sending an electronic notification to a notification address which is provided as metadata within an unlocking script of an input of the previous transaction.

2. The method according to claim 1, wherein traversing the blockchain comprises starting from an issuance transaction.

3. The method according to claim 1, further comprising:
completing, by the current owner of the asset associated with the current UTXO, the distribution transaction by signing an input of the distribution transaction.

4. The method according to claim 1, wherein the electronic notification comprises:
the distribution transaction; and/or
information relating to a location of, or means of access to, the distribution transaction.

5. The method according to claim 1, wherein the notification address is provided as a parameter in the unlocking script of the previous transaction to the first transaction.

6. The method according to claim 1, further comprising:
providing, in the distribution transaction, a hash of a second redeem script to ensure that a notification address will be provided in the unlocking script.

7. The method according to claim 6, wherein the hash of the second redeem script comprises a value indicating how many notification addresses must be supplied by the unlocking script.

8. The method according to claim 1, wherein a plurality of notification addresses is provided within the unlocking script.

9. The method according to claim 1, wherein the notification address is a network address, a cryptographic key, a uniform resource locator (URI), email address or any other address or identifier that can be represented in the metadata of a script and used as a destination for an electronic communication.

10. The method according to claim 1, further comprising:
detecting a designated or predetermined event; and
sending the electronic notification in response to detection of the event.

11. The method according to claim 1, wherein one or more operations of the method are executed by an automated computing resource or agent.

12. A computer-implemented system comprising a processor and memory, the memory storing computer executable instructions, that when executed, cause the processor to:
traverse a blockchain transaction history to identify a first transaction comprising a current unspent transaction output (UTXO);
review a previous transaction to the first transaction to determine a current owner of an asset associated with the current UTXO, the previous transaction comprising a hash of a redeem script;
generate a distribution transaction for the current UTXO, the distribution transaction based at least in part on the redeem script of the previous transaction; and
broadcast the distribution transaction, wherein the distribution transaction can only be signed and completed by the current owner of the asset associated with the current UTXO, wherein the distribution transaction is broadcasted through a broadcast channel separate to the blockchain, and the broadcast channel is established by sending an electronic notification to a notification address which is provided as metadata within an unlocking script of an input of the previous transaction.

13. The system according to claim 12, wherein the system comprises:
a blockchain; and
at least one autonomous computing agent arranged and configured to:
traverse the blockchain; and/or
generate and or send the electronic notification.

* * * * *